(12) United States Patent
Taras et al.

(10) Patent No.: US 8,418,486 B2
(45) Date of Patent: Apr. 16, 2013

(54) REFRIGERANT SYSTEM WITH VARIABLE SPEED COMPRESSOR AND REHEAT FUNCTION

(75) Inventors: Michael F. Taras, Fayetteville, NY (US); Alexander Lifson, Manlius, NY (US)

(73) Assignee: Carrier Corporation, Farmington, CT (US)

( * ) Notice: Subject to any disclaimer, the term of this patent is extended or adjusted under 35 U.S.C. 154(b) by 2460 days.

(21) Appl. No.: 11/102,007

(22) Filed: Apr. 8, 2005

(65) Prior Publication Data

US 2006/0225444 A1    Oct. 12, 2006

(51) Int. Cl.
F25B 29/00 (2006.01)
F25B 41/00 (2006.01)
F25D 17/04 (2006.01)

(52) U.S. Cl.
USPC .............................. 62/173; 62/196.1; 62/409

(58) Field of Classification Search ............... 62/90, 113, 62/173, 175, 186, 196.1, 238.6, 409
See application file for complete search history.

(56) References Cited

U.S. PATENT DOCUMENTS

| | | | | |
|---|---|---|---|---|
| 2,246,244 A | * | 6/1941 | Consley | 62/192 |
| 3,139,735 A | * | 7/1964 | Malkoff et al. | 62/173 |
| 3,410,405 A | | 11/1968 | Marsteller | |
| 4,325,223 A | * | 4/1982 | Cantley | 62/126 |
| 4,895,005 A | * | 1/1990 | Norbeck et al. | 62/506 |
| 5,054,294 A | | 10/1991 | Dudley | |
| 5,086,626 A | | 2/1992 | Iida | |
| 5,095,712 A | * | 3/1992 | Narreau | 62/113 |
| 5,245,836 A | | 9/1993 | Lorentzen et al. | |
| 5,255,529 A | | 10/1993 | Powell et al. | |
| 5,303,561 A | * | 4/1994 | Bahel et al. | 62/186 |
| 5,388,421 A | * | 2/1995 | Matsuoka | 62/209 |
| 5,490,394 A | | 2/1996 | Marques et al. | |
| 5,568,732 A | | 10/1996 | Isshiki et al. | |
| 5,582,022 A | * | 12/1996 | Heinrichs et al. | 62/175 |
| 5,613,369 A | | 3/1997 | Sato et al. | |
| 5,657,638 A | | 8/1997 | Erdman et al. | |
| 5,694,783 A | | 12/1997 | Bartlett | |
| 5,782,101 A | | 7/1998 | Dennis | |
| 5,797,276 A | | 8/1998 | Howenstine et al. | |
| 5,927,088 A | * | 7/1999 | Shaw | 62/175 |
| 5,987,908 A | | 11/1999 | Wetzel | |
| 6,073,457 A | | 6/2000 | Kampf et al. | |
| 6,138,467 A | * | 10/2000 | Lifson et al. | 62/217 |

(Continued)

FOREIGN PATENT DOCUMENTS

JP    2000-055436    *  2/2000

OTHER PUBLICATIONS

International Search Report and Written Opinion dated Jul. 27, 2007.

*Primary Examiner* — Chen Wen Jiang
(74) *Attorney, Agent, or Firm* — Carlson, Gaskey & Olds, PC

(57) ABSTRACT

Refrigerant systems are provided with selectively operable components that allow variation in the capacity provided by the refrigerant system to achieve desired temperature and humidity levels. A reheat circuit is provided and an economizer circuit may also be added to the system. Typically, the reheat and economizer functions each provide a step change in the humidity control. A compressor having a variable speed drive is utilized. By providing the reheat/economizer functions along with the variable speed compressor, continuously adjustable humidity control is achieved.

5 Claims, 3 Drawing Sheets

U.S. PATENT DOCUMENTS

| | | | |
|---|---|---|---|
| 6,269,650 B1 * | 8/2001 | Shaw | 62/176.6 |
| 6,293,123 B1 * | 9/2001 | Iritani et al. | 62/409 |
| 6,301,911 B1 * | 10/2001 | Reason et al. | 62/196.2 |
| 6,381,970 B1 * | 5/2002 | Eber et al. | 62/90 |
| 6,397,610 B1 | 6/2002 | Weng et al. | |
| 6,415,617 B1 | 7/2002 | Seem | |
| 6,434,960 B1 * | 8/2002 | Rousseau | 62/228.4 |
| 6,474,087 B1 | 11/2002 | Lifson | |
| 6,516,623 B1 * | 2/2003 | Collier | 62/238.7 |
| 6,560,980 B2 | 5/2003 | Gustafson et al. | |
| 6,672,087 B1 * | 1/2004 | Taras et al. | 62/173 |
| 6,694,756 B1 * | 2/2004 | Taras et al. | 62/173 |
| 6,694,763 B2 | 2/2004 | Howard | |
| 6,701,723 B1 * | 3/2004 | Dobmeier et al. | 62/90 |
| 6,705,093 B1 | 3/2004 | Taras et al. | |
| 6,705,097 B2 * | 3/2004 | So et al. | 62/158 |
| 6,826,920 B2 * | 12/2004 | Wacker | 62/176.6 |
| 6,968,708 B2 | 11/2005 | Gopalnarayanan et al. | |
| 6,973,797 B2 * | 12/2005 | Nemit, Jr. | 62/196.1 |
| 7,062,930 B2 * | 6/2006 | Rayburn | 62/173 |
| RE39,597 E * | 5/2007 | Rousseau | 62/228.4 |
| RE39,625 E * | 5/2007 | Shaw | 62/117 |
| 7,257,957 B2 * | 8/2007 | Lifson et al. | 62/196.3 |
| 2002/0157409 A1 * | 10/2002 | Pham et al. | 62/228.3 |
| 2003/0084674 A1 * | 5/2003 | Kawaguchi et al. | 62/228.5 |
| 2003/0192331 A1 * | 10/2003 | Alford | 62/173 |
| 2004/0035122 A1 | 2/2004 | Lifson et al. | |
| 2004/0108388 A1 * | 6/2004 | Wacker | 236/44 C |
| 2004/0211213 A1 | 10/2004 | Tsuboe et al. | |
| 2005/0022541 A1 * | 2/2005 | Rayburn et al. | 62/176.1 |
| 2005/0188708 A1 * | 9/2005 | Wills et al. | 62/175 |
| 2006/0117770 A1 * | 6/2006 | Park et al. | 62/175 |

* cited by examiner

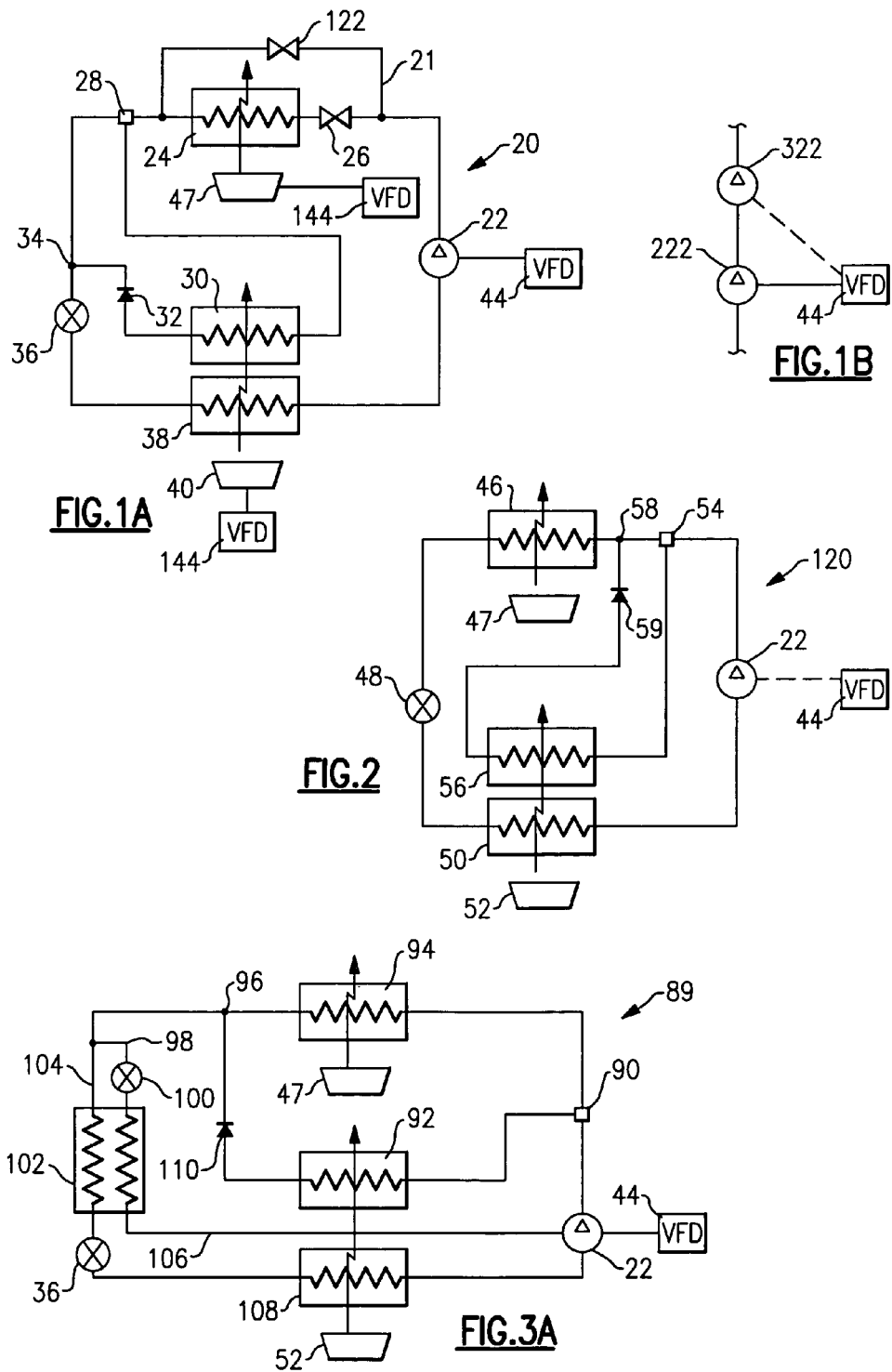

REFRIGERANT SYSTEM WITH VARIABLE SPEED COMPRESSOR AND REHEAT FUNCTION

BACKGROUND OF THE INVENTION

This invention relates to a variable speed motor for a compressor that is incorporated into a refrigerant system with a reheat function.

Refrigerant systems are utilized in many applications such as to condition an environment. Air conditioners and heat pumps are used to cool and/or heat the air entering an environment. The cooling or heating load on the environment may change with ambient conditions, and as the temperature and/or humidity levels demanded by an occupant of the building vary. Obviously, the refrigerant system operation and control have to adequately reflect these changes to maintain stable temperature and humidity conditions within the environment.

In some cases, while the system is operating in a cooling mode, the temperature level of the indoor air stream to provide a comfortable environment in a conditioned space may need to be higher than the temperature that would provide the ideal humidity level. On the other hand, lower the temperature of the air stream, more moisture can be removed from the air. These contradicting trends presented challenges to refrigerant system designers. One way to address such challenges is to utilize various schematics incorporating reheat coils. In many cases, a reheat coil placed on the indoor air path downstream of the evaporator is employed for the purposes of reheating the air supplied to the conditioned space, after it has been cooled in the evaporator, and where the moisture has been removed.

In the prior art, controls can be programmed to optionally actuate the reheat function. However, the humidity control provided by the reheat circuit is increased or decreased in steps. It would be desirable to provide the ability to vary the humidity control between these discrete steps.

In the past, attempts have been made to apply modulation or pulsation techniques to split and regulate refrigerant flow between a main circuit and a reheat branch. These approaches have not been found to be robust, and have strict limitations regarding their application range.

Variable speed drives are known for driving compressors at a variable speed in a refrigerant system. By driving the compressor at a higher or lower speed, the amount of refrigerant that is compressed changes, and thus effecting operational characteristics and system capacity.

Generally speaking, variable speed drives have not been utilized in refrigerant systems incorporating a reheat function for continuous dehumidification capability adjustment, and specifically in the refrigerant systems with variable sensible heat ratios. Thus, refrigerant systems that have incorporated a reheat function have been limited, in general, to providing the humidity control in discrete steps or over a narrow range of operating parameters.

SUMMARY OF THE INVENTION

In a disclosed embodiment of this invention, a variable speed drive compressor is provided in a refrigerant system with a reheat circuit. By selectively utilizing the reheat circuit, the refrigerant system can provide better humidity control. Further, by varying the speed of the compressor motor, humidity control below and above the step provided by the reheat circuit can be achieved.

A control identifies a desired humidity level, and then achieves this desired level by first actuating the reheat circuit if enhanced dehumidification is desired, or not actuating the reheat circuit, and then determining a desired variable speed for achieving that exact humidity level. In one simplified method, the variable speed is adjusted incrementally, and the humidity control provided is monitored. When the desired level is reached, then the system operates at that new speed. If the humidity still needs to be adjusted, then the motor speed is adjusted in another incremental step.

By providing the variable speed drive in combination with the reheat circuit, the present invention achieves the desired humidity level and control. Other design features, such as a condenser bypass and variable speed fans, to achieve variable sensible heat ratios, can be employed in combination with a variable speed compressor as well.

Another embodiment incorporates an economizer function along with the reheat circuit and a variable speed drive compressor. This combination provides additional flexibility in system operation and humidity control.

These and other features of the present invention can be best understood from the following specification and drawings, the following of which is a brief description.

BRIEF DESCRIPTION OF THE DRAWINGS

FIG. 1A shows a first embodiment refrigerant system.
FIG. 1B shows an option that would apply to any of the embodiments in this application.
FIG. 2 shows a second embodiment refrigerant system.
FIG. 3A shows a third embodiment refrigerant system.

DETAILED DESCRIPTION OF THE PREFERRED EMBODIMENT

Figure 3B:
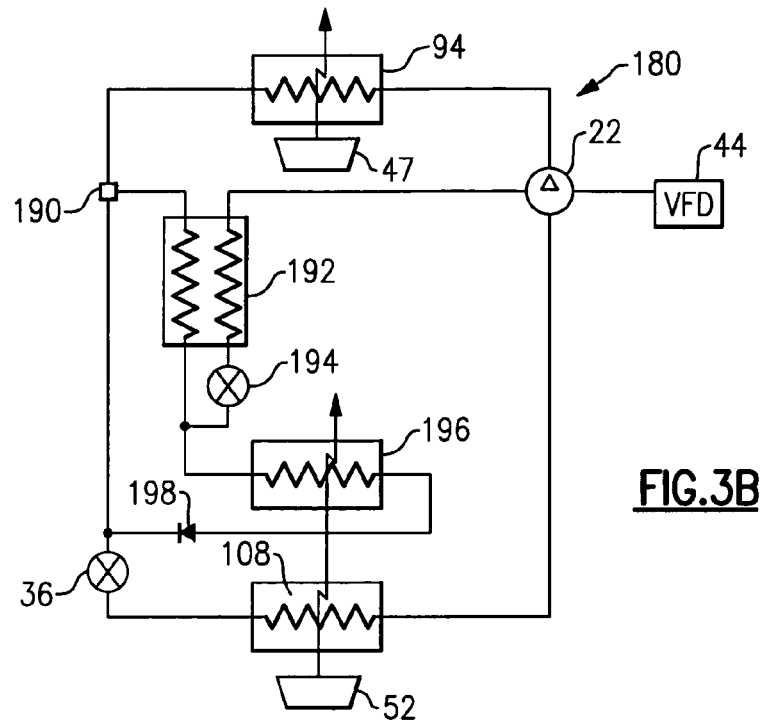
FIG. 3B shows an alternative schematic.

A refrigerant system 20 is illustrated in FIG. 1A having a compressor 22 provided with a control including a variable speed drive 44. It should be noted, that the terms "variable speed drive" and "variable frequency drive" have identical meaning within the scope of present invention and will be used interchangeably throughout the text. As is known, a motor for the compressor 22 can be driven at a variety of speeds such that the amount of refrigerant compressed by the compressor 22 per unit of time can be varied.

As shown in FIG. 1B, while a single compressor may be utilized, multi-stage compressors 222 and 322 may be employed as well. As is known, by utilizing staged compressors, a refrigerant system designer is provided with even more options and control. The variable speed drive 44 is shown communicating with one of the compressors (222) although it is also shown as optionally controlling both.

As further shown in FIG. 1A, variable speed drives 144 may be associated with the fans 40 and 47. A worker in this art would recognize when variable control over these fan motors would be beneficial.

Refrigerant compressed by the compressor 22 is passed to an outdoor heat exchanger 24, which would be the condenser in a cooling mode. Fan 47 moves air over the heat exchanger 24 to provide heat exchange with the refrigerant to condense and then subcool the refrigerant. An expansion device 36 is located downstream of the condenser 24, and an evaporator 38 is located downstream of the expansion device 36. As shown, a fan 40 moves air over the evaporator 38 to cool and dehumidify the air delivered to a conditioned space.

A three-way valve 28 selectively routes refrigerant from a location intermediate the expansion device 36 and condenser 24, and through a reheat heat exchanger 30. This refrigerant is passed through a check valve 32 and returned to a main circuit at a point 34 upstream of the expansion device 36 and downstream of the three-way valve 28.

As is known, when it is desired to have enhanced humidity control, the three-way valve 28 is moved to route refrigerant through the reheat coil 30, and back to the return point 34. Now, the air blown by the fan 40 and passing over the evaporator 38 may be cooled to a temperature below that which is desired by an occupant of the space conditioned by the refrigerant system 20. The air at that point has extra moisture removed, since its temperature has been decreased due to heat transfer interaction with the refrigerant in the evaporator 38. That air is then passed over the reheat coil 30, which heats the air back up to approach the desired temperature. Again, the reheat function is known in the prior art. It is the provision of such a reheat function in combination with a variable speed compressor that is inventive here.

An additional feature of the reheat circuit shown in FIG. 1A is an ability to obtain variable sensible heat ratios provided by a bypass line 21 having a valve 122 to selectively bypass at least a portion of refrigerant around the condenser 24. A valve 26 is operated in conjunction with the valve 122. Should considerably less cooling, but still significant dehumidification be desired in the space conditioned by the refrigerant system 20, then the bypass line 21 may be opened to bypass at least a portion of refrigerant through the valve 122 and around the condenser 24. The refrigerant reaching the evaporator 36 will thus have lower cooling potential than would be the case if it all had passed through the condenser 24 and been cooled. At the same time, the refrigerant passing through the reheat heat exchanger 30 will have higher heating potential. Consequently, the reheat function will allow removal of extra moisture from air supplied to the conditioned space without overcooling the space. This provides the sensible heat ratio required by an occupant of the conditioned space. A worker of ordinary skill in the art would recognize how to use this design feature.

FIG. 2 shows an alternate embodiment refrigerant system 120, wherein the compressor 22 is provided with a variable speed drive control 44. As in FIG. 1, a condenser 46 has a fan 47 for blowing air over the condenser 46. Also, as before, an expansion device 48 and an evaporator 50 having a fan 52 are located further downstream in the refrigerant circuit.

A reheat function is provided by a three-way valve 54 by selectively routing refrigerant from a location upstream of the condenser 46, passing it through a reheat coil 56 and a check valve 59 and returning it to a main circuit at a point 58, all located upstream of the condenser 56. A refrigerant system designer would recognize when this system would operate similarly to the schematics illustrated in FIG. 1A.

FIG. 3A shows a distinct embodiment of a refrigerant system, and with additional features. In particular, system design known as an economizer cycle is incorporated into the schematic. The economizer cycle combined with the reheat function provides even more flexibility in operation and control. Although the reheat heat exchanger is shown in series with the condenser in FIGS. 1A and 2, and is shown in parallel to the condenser in FIG. 3A, either arrangement is equally applicable and feasible. Further variations in the location of the tap for the reheat coil in relation to the condenser and economizer heat exchanger may also be utilized. As an example, the reheat coil may receive refrigerant from a tap located downstream of the condenser, rather than the upstream location as shown in FIG. 3. FIGS. 1-3 are merely intended in combination to show that many reheat schemes can be utilized with the present invention.

FIG. 3A shows embodiment 89, wherein the three-way valve 90 is positioned upstream of the condenser 94. When the reheat branch is in operation, refrigerant passes through the reheat coil 92, and may bypass the condenser 94, which may be maintained in an inactive mode. A check valve 110 and a return point 96 to the main cycle are shown downstream of the reheat coil 92. If an economizer expansion device 100 is open, a portion of refrigerant is rerouted through a tap line 98, economizer expansion device 100, economizer heat exchanger 102 and return line 106 to the economizer port of the compressor 22. A main refrigerant flow in a liquid line 104 also passes through the economizer heat exchanger 102 where heat transfer interaction between the two refrigerant flows (liquid high pressure refrigerant in the main loop and lower pressure refrigerant in the economizer branch) is taking place. In this embodiment, the condenser may be bypassed entirely by the refrigerant flow through the reheat coil 92. The tap line 98 may be positioned downstream of the economizer heat exchanger 102 as well.

Although the two flows 98 and 104 are shown flowing through the economizer heat exchanger 102 in the same direction in FIG. 3A, this is merely to simplify the illustration. In practice, it is generally preferred to have the two flows flowing through the economizer heat exchanger 102 in a counter-flow arrangement. The refrigerant in the tap line 98 subcools the refrigerant in the main line 104, such that after passing through the expansion device 36, it will have a higher cooling potential in the evaporator 108. Fan 52 moves air to be conditioned over the evaporator 108. From the evaporator 108, the refrigerant returns to a suction line leading back to the compressor 22. The refrigerant from the tap line 98 passes through a return line 106 to an intermediate compression point in the compressor 22. It should be understood that the economizer expansion device 100 also preferably includes a shut-off device, or a separate shut-off device is provided.

The economizer cycle may or may not be engaged. To turn off the economizer cycle, the economizer expansion device 100 may be closed such that no refrigerant is supplied to the tap line 98. Similarly, to turn off the reheat coil, the three-way valve 90 may be moved to such a position that no refrigerant is routed through the reheat coil 92. Thus, either of these two functions may be utilized independent of the other, or neither could be used. The present invention is mainly directed to providing the ability to use both techniques in combination with each other, while providing a better control over the humidity and temperature and along with the variable speed compressor 22. Also, it has to be understood that the three-way valve 90 can be substituted by a pair of conventional valves and if the expansion device is of such a type that it cannot be closed down completely, an additional shutoff valve may be placed on the tap line 98.

When low humidity temperature level is desired in the air stream to be supplied to a conditioned space, along with the capability to provide a significant amount of latent capacity, both economizer expansion device 100 and the three-way valve 90 are moved to an open position to operate both the economizer heat exchanger 102 and the reheat coil 92. Refrigerant passing through the main line 104 will be subcooled by the refrigerant from the tap line 98. Thus, that refrigerant will have a higher cooling potential (to achieve higher sensible and latent capacity) when reaching the evaporator 108. Consequently, an air stream provided by the fan 52 can be supplied at a lower temperature and humidity (since at this lower temperature more moisture can be removed from the air), at the exit of the evaporator 108 of the refrigerant system 89. This cooled and dehumidified air then passes over the reheat coil 92, which will have hot high pressure refrigerant, as it is positioned upstream of the main expansion device 36. This refrigerant will reheat the air to the desired temperature, while the moisture content in the air doesn't change. Thus, by utilizing the combination of the economizer cycle and reheat coil, a refrigerant system designer is able to achieve both desired temperature and humidity levels. Moreover, the higher efficiency levels are achieved due to implementation of the economizer cycle concept.

FIG. 3A shows an alternative schematic 180 wherein a three-way valve 190 selectively directs refrigerant to an economizer heat exchanger 192 and then serially to a reheat heat exchanger 196. As before, refrigerant returns to the main refrigerant circuit through a check valve 198. This schematic illustrates that a reheat coil can be positioned in series with the economizer heat exchanger, and downstream of the economizer heat exchanger. The earlier embodiment shows the reheat coil positioned although in series but upstream of the economizer heat exchanger. A worker in this art would recognize when each alternative might be most beneficial.

Figure 3C:
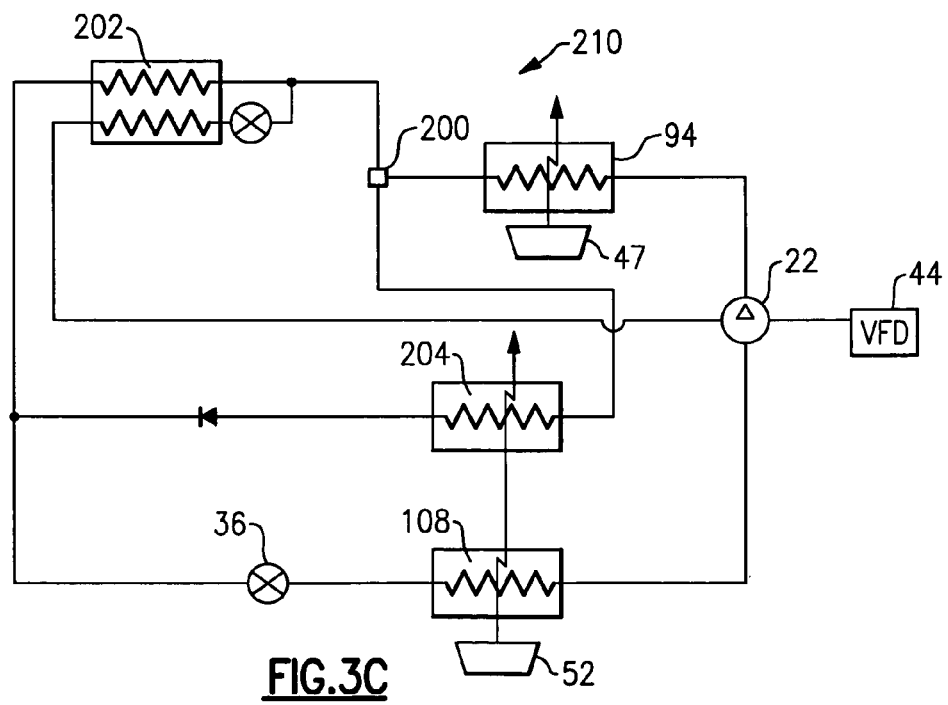
FIG. 3C shows an alternative schematic.

FIG. 3C shows yet another embodiment 210. In this embodiment, a three-way valve 200 selectively directs the refrigerant in a parallel flow pattern to the economizer heat exchanger 202 and to the reheat coil 204. Again, a worker in this art would recognize when a parallel flow arrangement would be more beneficial than a serial configuration.

Again, the FIGS. 1A, 1B, 2, 3A, 3B and 3C are merely an attempt to show possible reheat options. There is a large number of reheat circuit arrangements and configurations that may be utilized with the present invention. A decision on the particular reheat design concept and relative position of the reheat coil and economizer heat exchanger should be properly evaluated against specific application requirements and may have various degree of flexibility.

Figure 4:
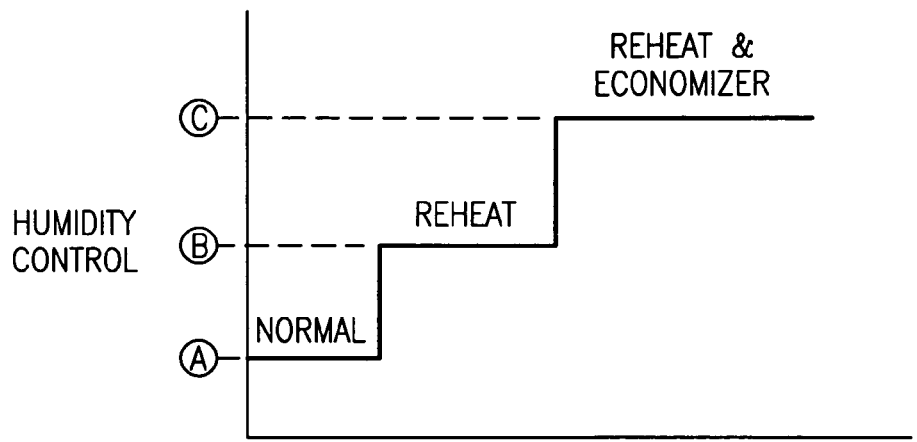
FIG. 4 shows the humidity control provided by the prior art.

A control 44 for either refrigerant cycle 20, 120, 89, 180 and 210 is able to identify sensible and latent capacity required to provide desired temperature and humidity levels, and operate the reheat function and/or the economizer function as necessary. Thus, as shown in FIG. 4, the prior art provided varying stages A, B, and C of humidity control. However, as can be seen, there are several values between values A, B, and C that cannot be provided by this prior art system. This is, of course, an oversimplification of the system, yet this does provide a good basis for understanding the present invention.

Figure 5:
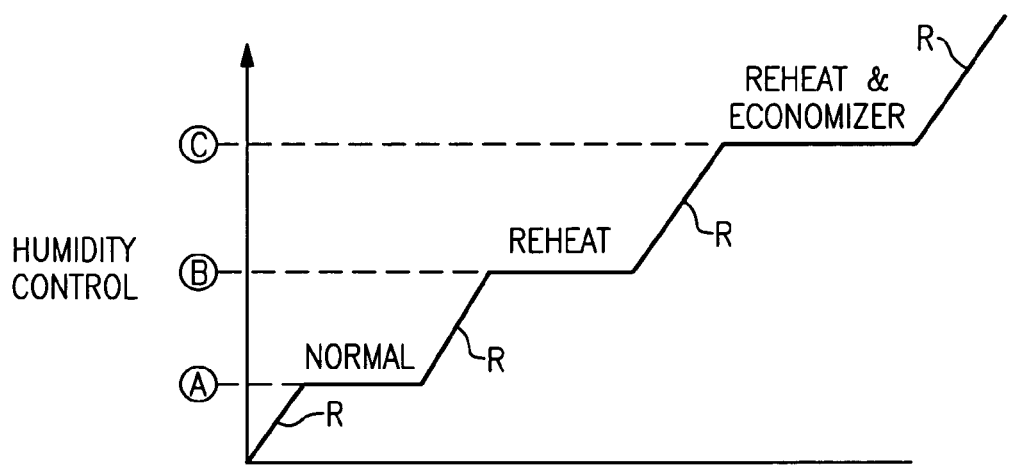
FIG. 5 shows the humidity control provided by the present invention.

For instance, in the FIG. 3A system, which includes a variable speed drive for its compressor motor, there are an infinite number of capacities provided between the base values A, B, and C, as shown in FIG. 5. Thus, as shown in FIG. 5, by reducing the speed of the compressor after the reheat function is activated, a ramp R downwardly toward normal capacity can be provided. By increasing the speed of the motor when the reheat function is activated, another ramp R can be provided. At some point, operating both economizer and reheat functions makes more sense than increasing the compressor speed. The decision of switching between modes of operation is usually based on system efficiency and component reliability but also can employ another system characteristic or a combination of those as criteria. Similarly, another ramp R can be provided between the reheat function and the economizer and reheat combined function by either ramping up the speed in the reheat mode of operation, or reducing the speed in the reheat and economizer mode of operation. A final ramp R is provided by increasing motor speed while operating the system with both reheat and economizer functions activated when even greater dehumidification is desired. A worker of ordinary skill in the art would recognize when any one of these functions would be desirable. The FIGS. 1A and 2 systems provide similar additional control features between stages A and B.

Figure 6:
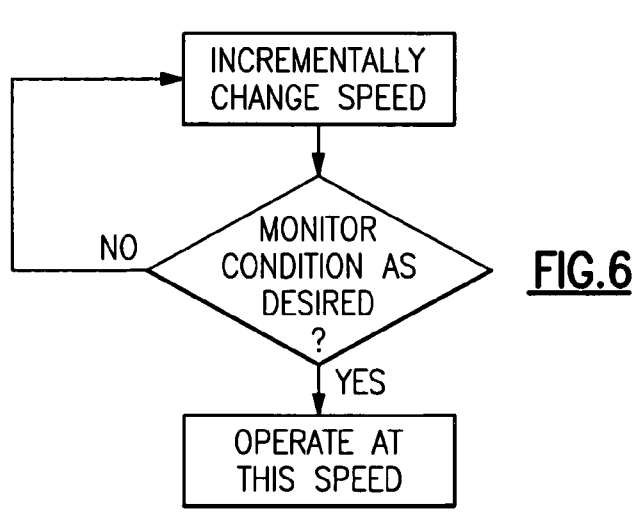
FIG. 6 is a flowchart of a control algorithm according to the present invention.

FIG. 6 shows how the ramps would typically be achieved with a standard variable speed motor control as is known in the prior art. Ramps R as shown in FIG. 5 are an oversimplification. In fact, the control typically moves in incremental steps (that may be uneven and depend on the control logic), and then monitors the operation of the refrigerant cycle after that incremental change. Thus, there would be a plurality of step changes along each ramp R, rather than the infinite number of changes as is illustrated in FIG. 5. However, FIG. 5 does provide a good illustration of the power of the present invention to provide adjustable dehumidification capability.

It has to be noted that variable speed compressors may be used in combination with variable speed fans to enhance system operation and control even further. Also, a variable speed compressor can be utilized in the conventional mode of operation as well to control temperature and thus humidity within a relatively narrow range, as known in the prior art.

Although preferred embodiments of this invention has been disclosed, a worker of ordinary skill in this art would recognize that certain modifications would come within the scope of this invention. For that reason, the following claims should be studied to determine the true scope and content of this invention.

What is claimed is:

1. A refrigerant system comprising:
   a compressor having a variable speed drive for varying a speed of said compressor;
   a condenser downstream of said compressor and an evaporator downstream of said condenser,
   a reheat circuit for selectively receiving refrigerant through a reheat heat exchanger, an air moving device passing air over said evaporator and said reheat heat exchanger;
   a control for selectively operating said reheat circuit to deliver refrigerant through said reheat heat exchanger, and said control also being operable to vary said speed of said compressor to achieve levels of humidity control between a level of control with said reheat circuit being operational, and a level of control without said reheat circuit being operational;
   said reheat circuit receives refrigerant in a serial flow arrangement relative to said condenser; and
   said reheat circuit receives refrigerant from a location upstream of said condenser.

2. A refrigerant system comprising:
   a compressor having a variable speed drive for varying a speed of said compressor;
   a condenser downstream of said compressor and an evaporator downstream of said condenser,
   a reheat circuit for selectively receiving refrigerant through a reheat heat exchanger, an air moving device passing air over said evaporator and said reheat heat exchanger;
   a control for selectively operating said reheat circuit to deliver refrigerant through said reheat heat exchanger, and said control also being operable to vary said speed of said compressor to achieve levels of humidity control between a level of control with said reheat circuit being operational, and a level of control without said reheat circuit being operational;
   a control identifies a desired humidity level, and approaches this desired level by actuating the reheat circuit if enhanced dehumidification is desired, and adjusting the speed of said compressor with said variable speed control to further approach the desired humidity level.

3. The refrigerant system as set forth in claim 2, wherein the control adjusts the speed of the compressor incrementally, and the control monitors humidity to ensure that the desired humidity level is approached.

4. A method of controlling a refrigerant system comprising the steps of:
   operating a refrigerant system and selectively actuating a reheat circuit to pass refrigerant through a reheat heat exchanger when additional humidity control is desired, and operating a control for a compressor to vary the speed of said compressor to provide levels of humidity control intermediate a discrete level provided by simply actuating or not actuating said reheat circuit; and a control identifies a desired humidity level, and approaches this desired level by actuating the reheat circuit if enhanced dehumidification is desired, and adjusting the speed of said compressor with said variable speed control to further approach the desired humidity level.

5. A method of controlling a refrigerant system comprising the steps of:
   operating a refrigerant system and selectively actuating a reheat circuit to pass refrigerant through a reheat heat exchanger when additional humidity control is desired, and operating a control for a compressor to vary the speed of said compressor to provide levels of humidity control intermediate a discrete level provided by simply actuating or not actuating said reheat circuit; and the control adjusts the speed of the compressor incrementally, and the control monitors humidity to ensure that the desired humidity level is approached.

* * * * *